(12) United States Patent  
Forsyth (10) Patent No.: US 7,743,859 B2
(45) Date of Patent: Jun. 29, 2010

(54) HYBRID DRIVETRAINS FOR TRAILERS

(75) Inventor: John R. Forsyth, Romeo, MI (US)

(73) Assignee: Magna Powertrain USA, Inc., Troy, MI (US)

( * ) Notice: Subject to any disclaimer, the term of this patent is extended or adjusted under 35 U.S.C. 154(b) by 632 days.

(21) Appl. No.: 11/626,412

(22) Filed: Jan. 24, 2007

(65) Prior Publication Data

US 2007/0193795 A1 Aug. 23, 2007

Related U.S. Application Data

(60) Provisional application No. 60/765,491, filed on Feb. 3, 2006.

(51) Int. Cl.
*B60K 1/00* (2006.01)

(52) U.S. Cl. .................. 180/65.1; 280/656; 701/70; 303/146

(58) Field of Classification Search ............ 180/65.1, 180/65.21, 65.22, 65.265, 65.31; 280/292, 280/405.1, 418, 423.1, 428, 656, 789; 903/947, 903/951; 701/70; 303/146
See application file for complete search history.

(56) References Cited

U.S. PATENT DOCUMENTS

| 4,771,838 | A | * | 9/1988 | Ketcham ................... 180/6.62 |
| 5,050,938 | A | * | 9/1991 | Brearley et al. ................ 303/7 |
| 5,080,445 | A | * | 1/1992 | Brearley et al. ................ 303/7 |
| 5,141,292 | A | * | 8/1992 | Gardell et al. ................. 303/7 |
| 5,513,719 | A | | 5/1996 | Moroto et al. |
| 5,558,350 | A | * | 9/1996 | Kimbrough et al. ......... 280/426 |
| 5,579,228 | A | * | 11/1996 | Kimbrough et al. ........... 701/41 |
| 5,943,918 | A | | 8/1999 | Reed, Jr. et al. |
| 6,019,698 | A | | 2/2000 | Lawrie et al. |
| 6,041,877 | A | | 3/2000 | Yamada et al. |
| 6,059,684 | A | | 5/2000 | Sasaki et al. |
| 6,083,138 | A | | 7/2000 | Aoyama et al. |
| 6,139,118 | A | * | 10/2000 | Hurst et al. .................... 303/7 |
| 6,170,587 | B1 | | 1/2001 | Bullock |
| 6,378,638 | B1 | | 4/2002 | Mizon et al. |
| 6,390,215 | B1 | * | 5/2002 | Kodama et al. .......... 180/65.22 |
| 6,401,850 | B1 | | 6/2002 | Bowen |
| 6,484,834 | B2 | | 11/2002 | Bowen et al. |
| 6,516,925 | B1 | * | 2/2003 | Napier et al. ........... 188/112 A |
| 6,595,308 | B2 | | 7/2003 | Bowen |
| 6,705,684 | B1 | * | 3/2004 | Garvey ....................... 303/123 |
| 6,725,955 | B2 | * | 4/2004 | Bidwell ....................... 180/11 |
| 6,959,970 | B2 | * | 11/2005 | Tseng .......................... 303/146 |
| 7,070,247 | B2 | * | 7/2006 | Offerle ....................... 303/146 |

(Continued)

FOREIGN PATENT DOCUMENTS

| JP | 11341605 A | * | 12/1999 |
| JP | 200314655 A | * | 11/2001 |

*Primary Examiner*—Paul N Dickson
*Assistant Examiner*—Jacob Meyer
(74) *Attorney, Agent, or Firm*—Harness, Dickey & Pierce, P.L.C.

(57) ABSTRACT

A trailer includes a pair of wheels rotatably coupled to a trailer frame. A motor is operable to provide drive torque to at least one of the wheels. The energy storage device is mounted to the frame and operable to selectively provide energy to the motor. A load sensor is operable to output a signal indicative of the magnitude of a load being transferred between the trailer and a tow vehicle. A controller is operable to generate control signals in response to the sensor signal. The control signals control operation of the motor.

19 Claims, 5 Drawing Sheets

U.S. PATENT DOCUMENTS

| | | | |
|---|---|---|---|
| 7,147,070 B2* | 12/2006 | Leclerc | 180/14.2 |
| 7,165,644 B2* | 1/2007 | Offerle et al. | 180/244 |
| 7,229,139 B2* | 6/2007 | Lu et al. | 303/140 |
| 7,338,335 B1* | 3/2008 | Messano | 180/65.22 |
| 7,401,870 B2* | 7/2008 | Tseng et al. | 303/146 |
| 2001/0003393 A1* | 6/2001 | Cooper | 280/411.1 |
| 2002/0095251 A1* | 7/2002 | Oh et al. | 701/70 |
| 2003/0029651 A1* | 2/2003 | Palmeri | 180/65.1 |
| 2005/0000739 A1* | 1/2005 | Leclerc | 180/14.2 |
| 2005/0234623 A1* | 10/2005 | Theisen | 701/45 |
| 2005/0236896 A1* | 10/2005 | Offerle et al. | 303/146 |
| 2005/0253445 A1* | 11/2005 | Beiler et al. | 298/22 C |
| 2006/0076828 A1* | 4/2006 | Lu et al. | 303/146 |
| 2006/0287797 A1* | 12/2006 | Haller et al. | 701/70 |
| 2007/0271017 A1* | 11/2007 | Samie | 701/55 |
| 2008/0169144 A1* | 7/2008 | DeGrave et al. | 180/165 |
| 2009/0069951 A1* | 3/2009 | Liljeblad et al. | 701/1 |
| 2009/0273232 A1* | 11/2009 | Barlsen et al. | 303/198 |

* cited by examiner

FIG. 5

HYBRID DRIVETRAINS FOR TRAILERS

CROSS REFERENCE

This application claims the benefit of U.S. Provisional Application Ser. No. 60/765,491 filed Feb. 3, 2006, the entire disclosure of which is incorporated by reference.

FIELD

The present disclosure relates to hybrid drive systems for motor vehicles. More specifically, the present invention relates to an integrated motor and axle assembly for use in a towed trailer.

BACKGROUND

Automobile manufacturers are actively working to develop alternative powertrain systems in an effort to reduce the level of pollutants exhausted into the air by conventional powertrains equipped with internal combustion engines. Significant development has been directed to electric vehicles and fuel cell vehicles. Unfortunately, these alternative powertrain systems suffer from several disadvantages and, for all practical purposes, are still under development. However, several different hybrid electric vehicles (HEV) have recently been offered for sale. These hybrid vehicles are equipped with an internal combustion engine and an electric motor that can be operated independently or in combination to drive the vehicle.

There are two types of hybrid vehicles, namely, series hybrid and parallel hybrid. In a series hybrid vehicle, power is delivered to the wheels by the electric motor which draws electrical energy from the battery. The engine is used in series hybrid vehicles to drive a generator which supplies power directly to the electric motor or charges the battery when the state of charge falls below a predetermined value. In parallel hybrid vehicles, the electric motor and the engine can be operated independently or in combination pursuant to the running conditions of the vehicle. Typically, the control strategy for such parallel hybrid vehicles utilizes a low-load mode where only the electric motor is used to drive the vehicle, a high-load mode where only the engine is used to drive the vehicle, and an intermediate assist mode where the engine and electric motor are both used to drive the vehicle. Regardless of the type of hybrid drive system used, hybrid vehicles are highly modified versions of conventional vehicles that are expensive due to the componentry, required control systems, and specialized packaging requirements.

Hybrid powertrains have also been adapted for use in four-wheel drive vehicles and typically utilize the above-noted parallel hybrid powertrain to drive the primary wheels and a second electric motor to drive the secondary wheels. Such a four-wheel drive system is extremely expensive and difficult to package.

Many owners of four-wheel drive SUV-type vehicles and pickup-type trucks enjoy the ability to tow relatively large trailers with these vehicles. For example, large travel trailers and/or construction equipment trailers may be towed by vehicles ranging in size from pickup trucks to 3500 size trucks. Furthermore, tow vehicles as large as Class 8 tractors are often coupled to trailers to transport cargo over the road. Depending on the load being towed, performance of the tow vehicle and trailer combination may be very different from the performance of the tow vehicle alone.

Most trailers that are towed by SUVs are equipped with wheels that are not operable to provide drive torque to the ground. The trailer wheels are typically not braked or include relatively crude braking systems that actuate the brakes based only upon a transfer of load to the trailer tongue during a deceleration of the tow vehicle. Furthermore, even though the tow vehicle may be equipped with traction control and/or stability control systems, little or no communication occurs between the tow vehicle control systems and the trailer. Lastly, the trailers that are equipped with brakes typically decelerate by converting kinetic energy into heat. The heat energy is not stored but simply vented to the atmosphere. Thus, a need exists to develop hybrid powertrains for use in towed trailers to improve energy efficiency, vehicle performance and handling.

SUMMARY

A trailer includes a pair of wheels rotatably coupled to a trailer frame. A motor is operable to provide drive torque to at least one of the wheels. The energy storage device is mounted to the frame and operable to selectively provide energy to the motor. A load sensor is operable to output a signal indicative of the magnitude of a load being transferred between the trailer and a tow vehicle. A controller is operable to generate control signals in response to the sensor signal. The control signals control operation of the motor.

Furthermore, the present disclosure provides a tow vehicle and trailer combination including a pair of wheels rotatably coupled to a trailer frame. A motor is operable to provide drive torque to one of the wheels. An energy storage device is mounted to the frame and in communication with the motor. Vehicle sensors generate signals indicative of the operating characteristics of the tow vehicle. A controller is operable to generate control signals in response to the sensor signals. The control signals are delivered to the motor to control operation of the motor.

Additionally, the present disclosure describes an alternate embodiment trailer including a coupler adapted to interconnect the trailer and a tow vehicle. A first motor/generator is mounted on a first wheel. A second motor/generator is mounted on a second wheel. A power storage device is in communication with the first and second motor/generators. A controller is operable to generate control signals. The control signals are sent to the first and second motor/generators to selectively operate the motor/generators in one of a regenerative braking mode and a torque supplying mode.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

The present disclosure is related to a drivetrain for a trailer that functions as a system for delivering motive power (i.e., drive torque) to at least one ground-engaging trailer wheel. An energy storage device is coupled to the trailer and is in communication with at least one motor/generator. Accordingly, a truck and trailer combination equipped with a drivetrain of the present disclosure may exhibit improved efficiency and performance by incorporating regenerative braking techniques as well as being operable to provide drive torque for launching and hill climbing applications. Vehicle handling may also be improved through the use of torque vectoring and/or individual wheel braking. Accordingly, various features and functional characteristics of the trailer drivetrain will be set forth below in a manner permitting those skilled in the relevant arts to fully comprehend and appreciate the significant advantages the present disclosure provides.

Figure 1:
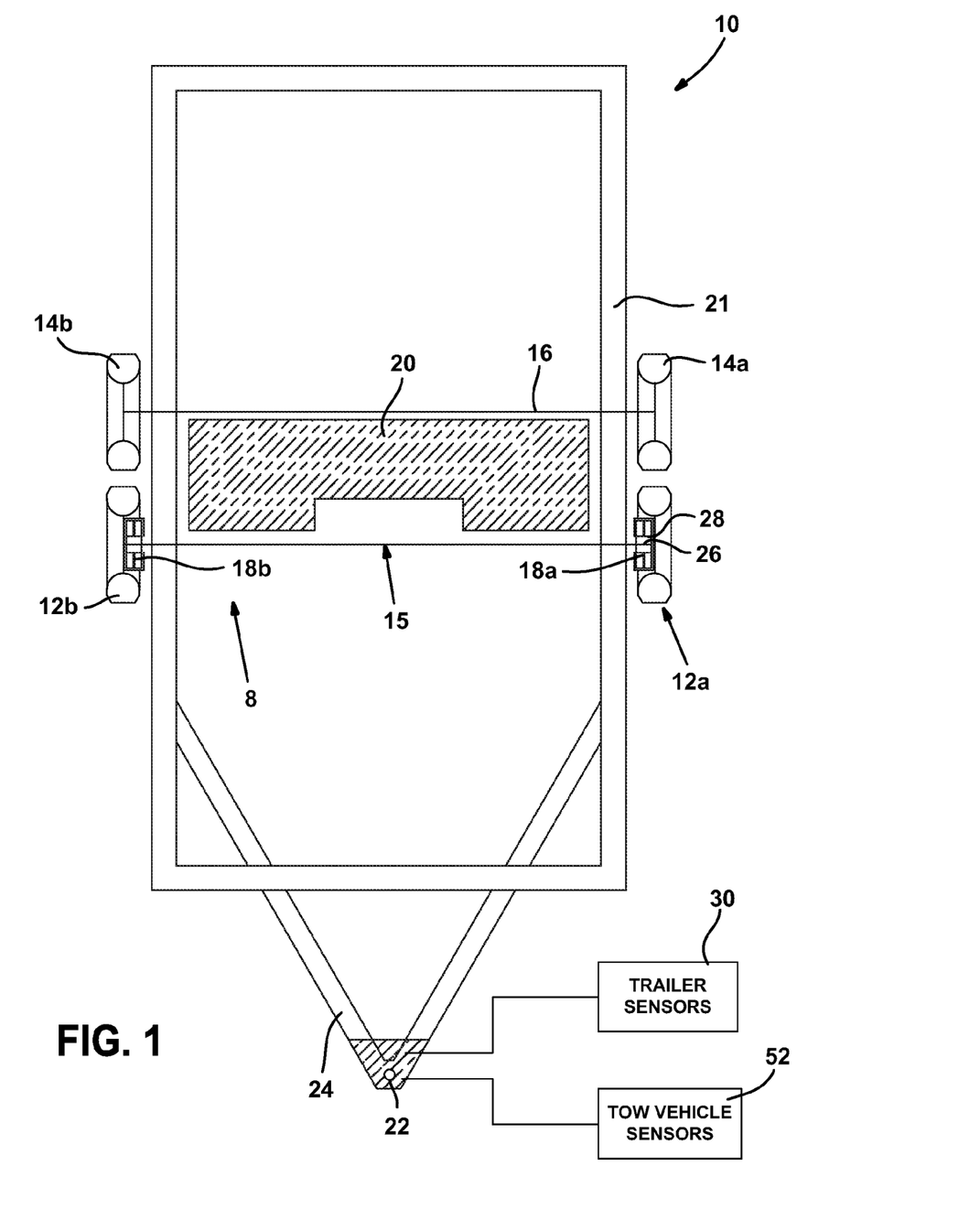
FIG. 1 is a schematic view showing a hybrid powertrain for a trailer in accordance with the present disclosure.

FIG. 1 depicts a drivetrain 8 for a trailer 10 having a first driven wheel 12a and a second driven wheel 12b mounted to an axle 15. Wheels 14a and 14b are shown rotatably coupled to an axle 16. Wheels 14a and 14b are neither driven nor braked. However, it should be appreciated that wheels 14a and 14b may be equipped with a drivetrain if additional trailer drive torque or regenerative braking capability is desired.

A first wheel motor/generator 18a is drivingly coupled to first driven wheel 12a for selectively providing drive torque to the ground. A second wheel motor/generator 18b is drivingly coupled to second driven wheel 12b. An energy storage device 20 is mounted to a frame 21 of trailer 10. Energy storage device 20 is operable to independently provide energy to first wheel motor/generator 18a and second wheel motor/generator 18b.

Motor/generators 18a and 18b are operable in any one of a drive mode, a charging mode, and a no-load mode. In the drive mode, motor/generators 18a and 18b function as motors driven by electrical energy drawn from energy storage device 20. Drive torque is provided to wheels 12a and/or 12b during this mode of operation. In the charging mode, motor/generators 18a and 18b function as electric generators providing electrical energy to energy storage device 20. More particularly, kinetic energy from the moving truck and trailer combination is converted to electrical energy and stored in energy storage device 20. The charging mode is also known as regenerative braking. In the no-load mode, motor/generators 18a and 18b are off and a motor shaft 26 is permitted to rotate freely relative to a stator 28. It should be appreciated that while motor generators 18a and 18b have been described as electrical devices, similar hydraulic motors are contemplated for use in drivetrain 8. To complete the system, energy storage device 20 may be a hydraulic energy storage device.

A coupler and controller 22 is mounted on a tongue 24 of frame 21. Coupler and controller 22 is in communication with first wheel motor/generator 18a and second wheel motor/generator 18b. Each motor/generator is individually operable. Accordingly, different magnitudes of torque may be provided to each driven wheel. Furthermore, individual wheel braking is possible to allow torque vectoring to improve vehicle stability.

Various trailer sensors 30 are schematically depicted in FIG. 1 as being in communication with coupler and controller 22. In a simplified embodiment, trailer sensors 30 include a load sensor operable to output a signal indicative of the load being transferred between trailer 10 and a tow vehicle (not shown). Coupler and controller 22 is operable to output signals to first wheel motor/generator 18a and second wheel motor/generator 18b sufficient to place either of the motor/generators in one of the drive mode, the charging mode or the no-load mode. For example, if the load sensor indicates that a tensile load exceeding a predetermined magnitude exists between the tow vehicle and trailer 10, coupler and controller 22 will signal first wheel motor/generator 18a and second wheel motor/generator 18b to provide drive torque to wheels 12a and 12b, respectively. If the load sensor outputs a signal indicating that a compressive load exceeding a predetermined magnitude exists between trailer 10 and the tow vehicle, wheel motor/generator 18a and wheel motor/generator 18b will be switched to their charging modes where regenerative braking will occur at wheels 12a and 12b. During this operational mode, energy is transferred to energy storage area 20. Other signals from the load sensor may cause coupler and controller 22 to operate first wheel motor/generator 18a and/or second wheel motor/generator 18b in the no-load mode.

Figure 2:
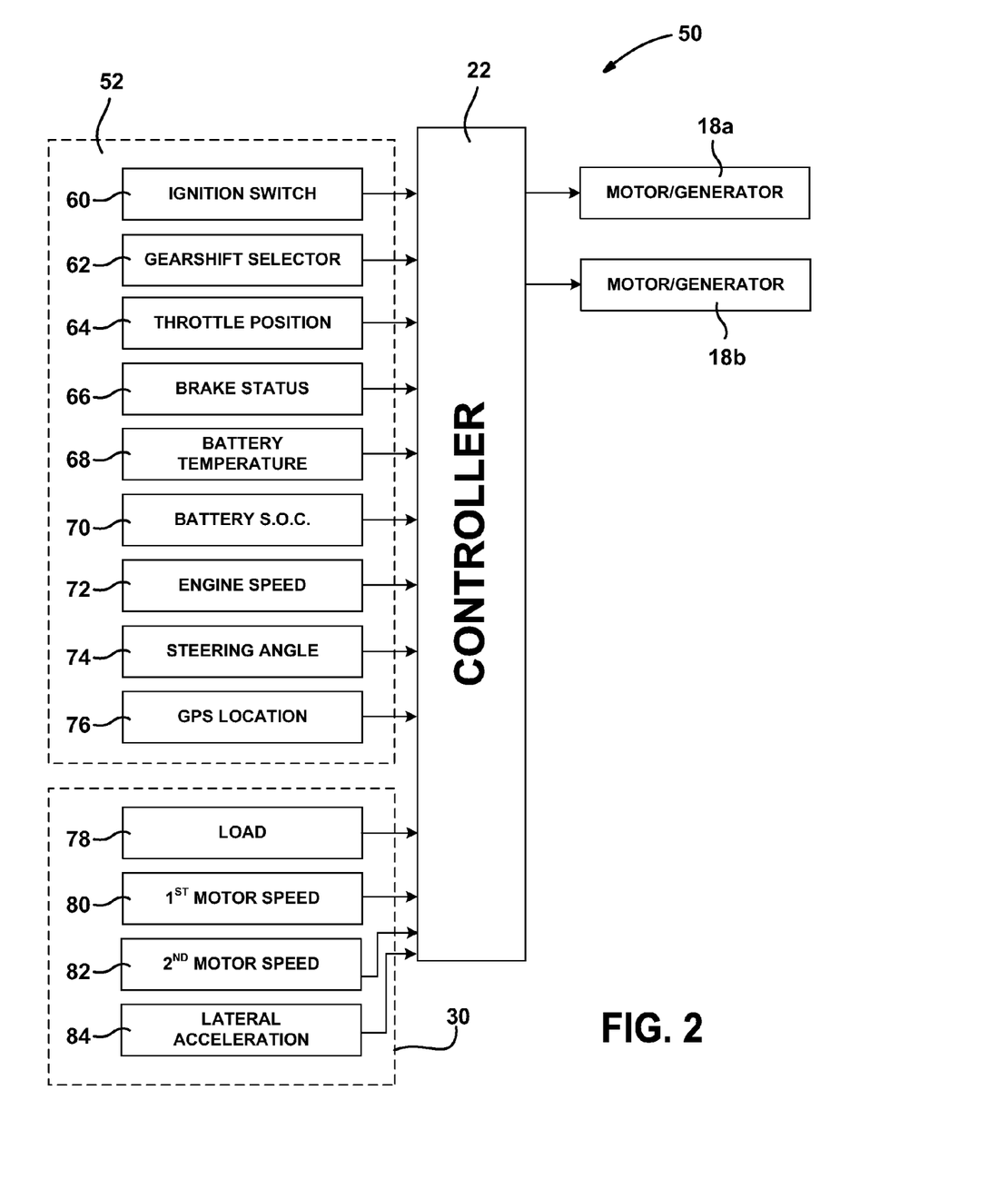
FIG. 2 is a schematic diagram of an exemplary control system associated with the powertrains of the present disclosure.

As shown in FIG. 2, coupler and controller 22 may be part of a more complex exemplary control system 50. In this embodiment, coupler and controller 22 is adapted to receive input signals from trailer sensors 30 as well as various additional sensors and input devices cumulatively identified as vehicle sensors 52. Coupler and controller 22 performs data processing operations to execute various control routines according to control programs and/or maps stored in ROM. Coupler and controller 22 receives data from vehicle sensors including an ignition switch 60, a gear shift lever switch 62, a throttle position sensor 64, a brake status switch 66, a battery temperature sensor 68 and a battery state of charge sensor 70. In addition, other inputs include an engine speed sensor 72, a vehicle steering angle sensor 74 and a GPS location sensor 76.

As previously described, trailer sensors 30 include a load sensor 78 operable to output a signal indicative of a load and the direction of the load transferred between trailer 10 and the tow vehicle. Trailer 10 may also be equipped with a first motor/generator speed sensor 80, a second motor/generator speed sensor 82, and a number of sensors 84 operable to output signals indicative of the lateral acceleration of specific locations on trailer 10.

Based on the operating information input to coupler and controller 22, a mode of operation of the trailer drivetrain is selected and coupler and controller 22 sends control signals to various power-operated control devices such as motor/generators 18a and 18b. For example, if GPS location sensor 76 provides information indicating that the vehicle is traveling down a grade and throttle position sensor 64 indicates that additional drive torque is not being requested, the charging mode may be entered.

Figure 3:
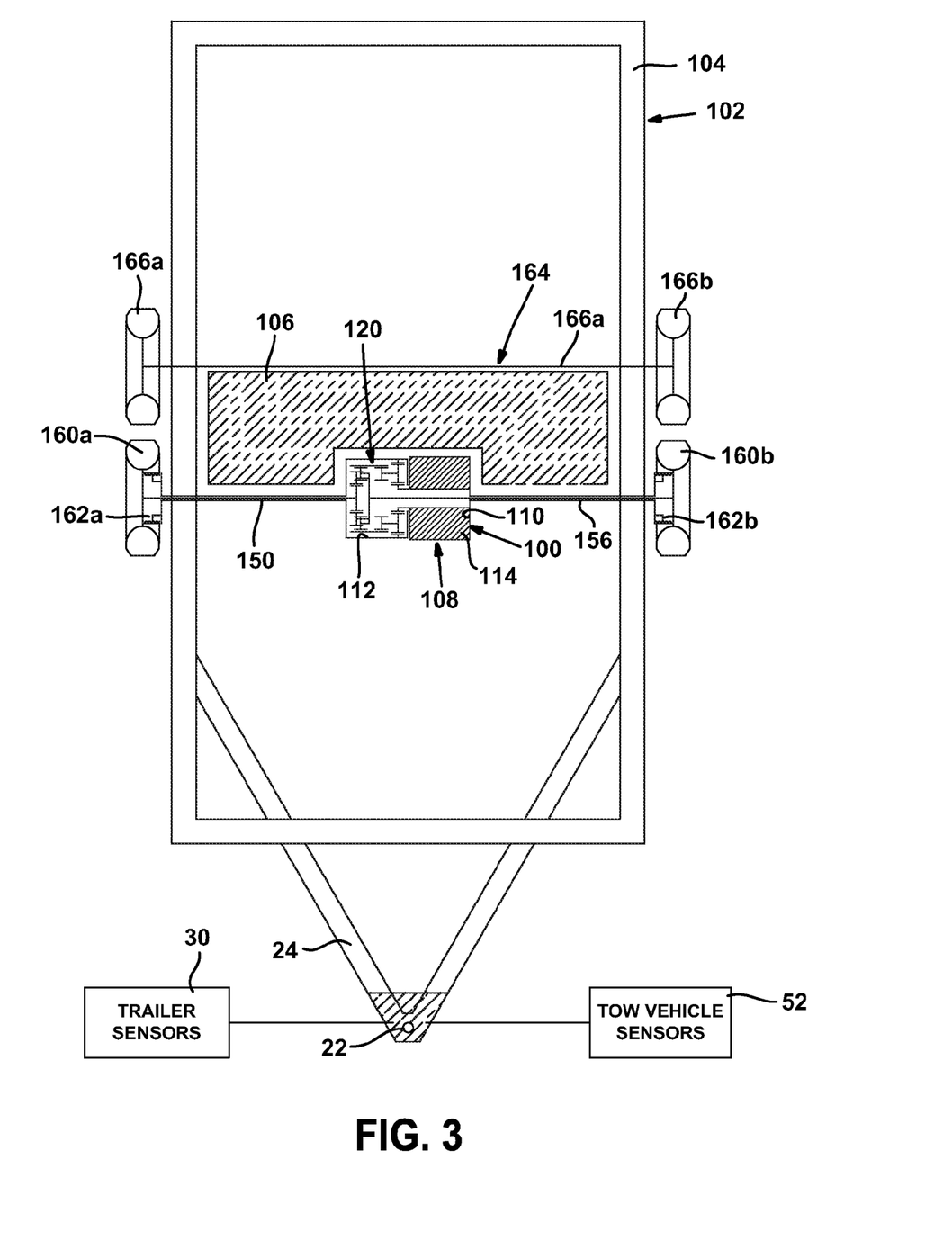
FIG. 3 is a schematic view of an alternate embodiment trailer equipped with a trailer axle drive arrangement in accordance with the present disclosure.
Figure 4:
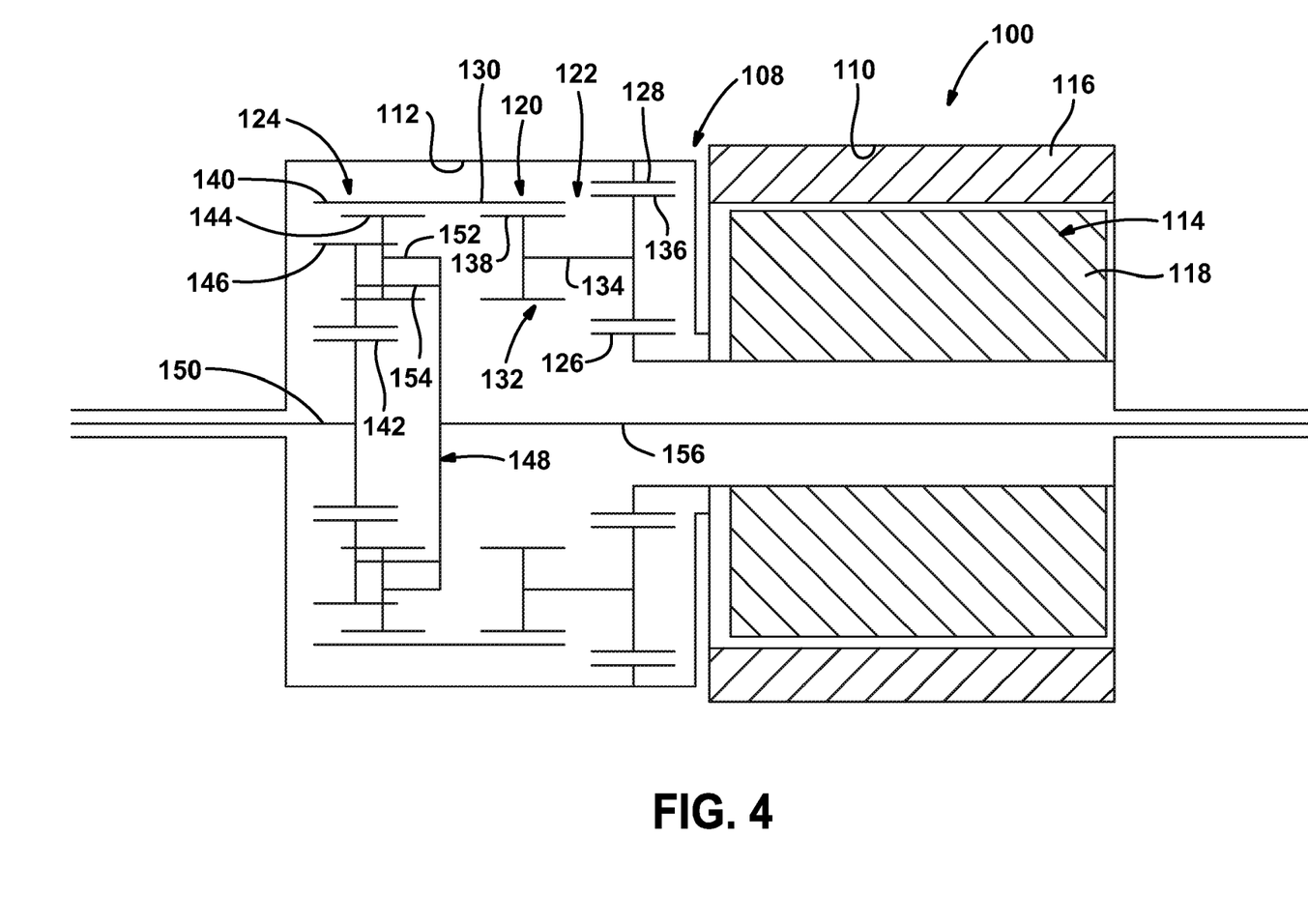
FIG. 4 is a schematic depicting the components associated with the drive motor axle of FIG. 3.

FIGS. 3 and 4 depict an alternate embodiment drivetrain 100 configured as a drive motor axle adapted to provide motive power to a trailer 102. Drive motor axle 100 is mounted to a frame 104 of trailer 102. Drive motor axle 100 may be electrically or hydraulically powered by an energy storage device 106 also mounted to frame 104. Drive motor axle 100 includes a multi-section housing assembly 108 defining a motor chamber 110 and a gearbox chamber 112. An electric variable speed motor assembly 114 is located within motor chamber 110 and includes a wound stator 116 secured to housing assembly 108 and an elongated tubular rotor 118. Rotor 118 is supported at its opposite ends by bearing assemblies (not shown) for rotation relative to housing assembly 108. While the figures depict an electric variable speed motor assembly, one skilled in the art will appreciate that equivalent hydraulic motor components are also contemplated as being within the scope of the present disclosure.

Drive motor axle 100 further includes a gearbox 120 located within gearbox chamber 112 and which is comprised of a reduction unit 122 and a differential assembly 124. Reduction unit 122 is a planetary gearset including a sun gear 126, a first ring gear 128 fixed to housing assembly 108, a second ring gear 130, and a plurality of compound planet gears 132 rotatably supported by a planet carrier 134. Sun gear 126 can be integrally formed at one end of rotor 118 (as shown) or, in the alternative, can be a tubular unit that is fixedly secured to rotor 118. Each compound planet gear 132 includes a first gear segment 136 that is meshed with first ring gear 128 and with sun gear 126 as well as a second gear segment 138 that is meshed with second ring gear 130. First and second gear segments 136 and 138 can be integrally formed or, in the alternative, can be defined by separate gears which are rigidly fixed together (i.e., welded) for common rotation.

With continued reference to FIGS. 3 and 4, differential assembly 124 is shown to be a planetary gearset having a third ring gear 140, a second sun gear 142, and meshed pairs of first pinions 144 and second pinions 146 each rotatably supported from a pinion carrier 148. In particular, third ring gear 140 is formed on an axial extension of second ring gear 130 so as to rotate at a common speed therewith. Second sun gear 142 is shown to be integrally formed at one end of a first output shaft 150. Pinion carrier 148 includes a first carrier ring 152 interconnected to a second carrier ring 154 which, in turn, is fixed to one end of a second output shaft 156. First pinions 144 are meshed with third ring gear 140. Second pinions 146 are meshed with second sun gear 142. As noted, pinions 144 and 146 are circumferentially arranged in meshed pairs around pinion carrier 148.

Differential assembly 124 is drivingly coupled to gear reduction unit 122 to provide a 50/50 torque split between a first powered wheel 160a and a second powered wheel 160b. Drivetrain 100 is operable in one of the drive mode, the charging mode and the no-load mode as described in relation to drivetrain 8. Additionally, wheel 160a is equipped with a wheel brake 162a and wheel 160b is equipped with a wheel brake 162b. Wheel brakes 162a and 162b are individually operable to transmit torque when operating conditions are not conducive for regenerative braking to occur through drivetrain 100. Some vehicle stability control systems may require the flexibility of individual brake control with simultaneous torque supply.

A non-driving axle assembly 164 is coupled to frame 104 and positioned rearward of drive motor axle 100. Axle assembly 164 includes a pair of wheels 166a and 166b which are free to rotate about an axle tube 168. Energy storage device 106 is shown coupled to frame 104 and positioned between drive motor axle 100 and axle assembly 164.

Figure 5:
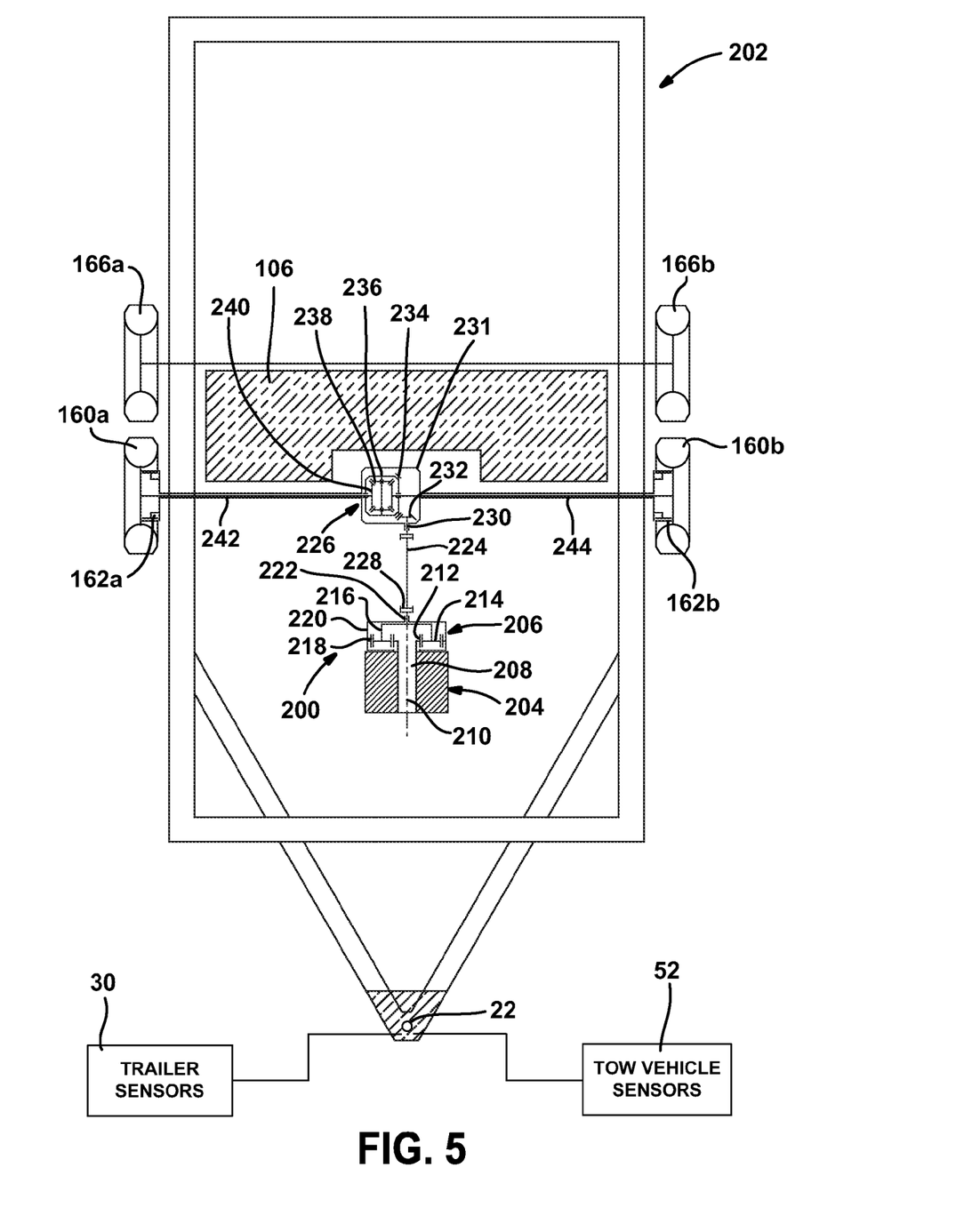
FIG. 5 is a schematic view of another alternate embodiment trailer having an alternative driveline arrangement.

FIG. 5 depicts another alternate embodiment drivetrain 200 mounted to an exemplary trailer 202. Trailer 202 is substantially similar to trailer 102. Accordingly, like elements will retain their previously introduced reference numerals. Drivetrain 200 is selectively operable to transmit drive torque to first powered wheel 160a and second powered wheel 160b. Drivetrain 200 is also operable in one of the drive mode, the charging mode and the no-load mode as previously described with reference to drivetrain 8.

Drivetrain 200 includes a motor 204 drivingly coupled to a gear reduction unit 206. Motor 204 may be electrically powered or hydraulically powered via energy stored in energy storage device 106. Motor 204 includes an output shaft 208 rotatable about an axis 210 longitudinally extending through trailer 202.

Gear reduction unit 206 includes a sun gear 212 coupled for rotation with output shaft 208. A plurality of planet gears 214 are rotatably supported on a carrier 216. A ring gear 218 is mounted to a housing 220 of gear reduction unit 206. Planet gears 214 are drivingly engaged with sun gear 212 and ring gear 218. An output shaft 222 is coupled to carrier 216. A propeller shaft 224 drivingly interconnects gear reduction unit 206 and a differential assembly 226. Universal joints 228 allow output shaft 222 and an input shaft 230 of differential assembly 226 to rotate on axes that are not aligned with one another.

Input shaft 230 is rotatably supported by a carrier housing 231. Input shaft 230 is integrally formed with a pinion gear 232. Pinion gear 232 is drivingly engaged with a ring gear 234. Ring gear 234 is mounted on a differential housing 236. Differential housing 236 is rotatably supported by carrier housing 231. A plurality of pinion gears 238 are rotatably supported by differential housing 236. A plurality of side gears 240 are drivingly engaged with pinion gears 238 and also rotatably supported by differential housing 236. A first output shaft 242 drivingly interconnects one of side gears 240 and first powered wheel 160a. A second output shaft 244 transmits torque from the other side gear 240 to second powered wheel 160b.

Coupler and controller 22 is mounted to trailer 202 and operable to provide control signals to drivetrain 200 causing drivetrain 200 to operate in one of the drive, charging or no-load modes. Coupler and controller 22 may also communicate with additional sensors and input devices previously identified as vehicle sensors 52. Accordingly, trailer 202 may be configured to operate using a single sensor input such as load sensor 78, additional trailer sensors 30 or a more complex control system similar to control system 50 as previously described.

Furthermore, the foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. A trailer comprising:

a trailer frame;

a single drive motor axle mounted to the frame and including one electric motor, a differential assembly coupled to the motor, a first output shaft coupled to the differential assembly and a second output shaft coupled to the differential assembly, wherein the motor, differential assembly and first and second output shafts are coaxially disposed;

a pair of wheels coupled to the respective first and second output shafts;

an energy storage device mounted to the frame, the energy storage device being operable to selectively provide energy to the motor;

a load sensor operable to output a signal indicative of the magnitude of a load being transferred between the trailer and a tow vehicle; and a controller operable to generate control signals in response to the sensor signal, the control signals controlling the operation of the motor.

2. The trailer of claim 1 wherein the motor is operable in a regenerative braking mode where rotation of each of the wheels is resisted and energy is transferred to the energy storage device.

3. The trailer of claim 1 wherein the drive motor axle further comprises a gear reduction unit coupled to the motor and the differential assembly, the gear reduction unit configured to provide a 50/50 torque split between the pair of wheels.

4. A trailer comprising:
a trailer frame;
a pair of wheels rotatably coupled to the trailer frame;
a motor operable to provide drive torque to at least one of the wheels;
an energy storage device mounted to the frame, the energy storage device being operable to selectively provide energy to the motor;
a load sensor operable to output a signal indicative of the magnitude of a load being transferred between the trailer and a tow vehicle; and
a controller operable to generate control signals in response to the sensor signal, the control signals controlling the operation of the motor;
wherein the motor is also operable in a regenerative braking mode where rotation of the at least one wheel is resisted and energy is transferred to the energy storage device, the regenerative braking mode is entered when the load on the load sensor exceeds a predetermined value indicative of tow vehicle braking.

5. The trailer of claim 4 wherein drive torque is provided to the at least one wheel when the load on the load sensor exceeds a predetermined value indicative of tow vehicle acceleration.

6. The trailer of claim 5 wherein the motor is operable in a no-load state where neither regenerative braking nor torque supply is being provided by the motor.

7. The trailer of claim 4 wherein the motor includes a rotatable output shaft extending substantially perpendicular to a forward direction of trailer travel.

8. The trailer of claim 4 further including another sensor coupled to the trailer, the another sensor being operable to output a signal indicative of the lateral acceleration of the trailer to the controller.

9. The trailer of claim 4 wherein the load sensor is operable to output a signal indicative of the direction of the load being transferred between the trailer and the tow vehicle.

10. The trailer of claim 4 wherein the controller is adapted to receive signals from sensors mounted on a tow vehicle.

11. The trailer of claim 4 wherein the motor is electrically operable.

12. A trailer comprising:
a trailer frame;
a pair of wheels rotatably coupled to the trailer frame;
a motor operable to provide drive torque to at least one of the wheels, wherein the motor is drivingly coupled to a gear reduction unit and a differential assembly, the differential assembly operable to provide output torque to each of the wheels;
an energy storage device mounted to the frame, the energy storage device being operable to selectively provide energy to the motor;
a load sensor operable to output a signal indicative of the magnitude of a load being transferred between the trailer and a tow vehicle; and
a controller operable to generate control signals in response to the sensor signal, the control signals controlling the operation of the motor.

13. The trailer of claim 12 wherein the gear reduction unit includes a planetary gearset.

14. The trailer of claim 13 wherein one of the gears of the planetary gearset rotates about an axis aligned with an axis of rotation of one of the wheels.

15. A trailer comprising:
a coupler adapted to interconnect the trailer and a tow vehicle;
a motor/generator in driving communication with a wheel supporting the trailer for movement across a ground surface;
a power storage device in communication with the motor/generator; and
a controller operable to generate control signals, the control signals being sent to the motor/generator to selectively operate the motor/generator in one of a regenerative braking mode and a torque supplying mode;
wherein the motor/generator is operable in a no-load state where neither regenerative braking nor torque supply is being provided by the motor/generator.

16. The trailer of claim 15 further including a sensor coupled to the trailer, the sensor being operable to output a signal indicative of the lateral acceleration of the trailer to the controller.

17. The trailer of claim 15 further including a load sensor coupled to the trailer, the load sensor being operable to output a signal indicative of a magnitude of a load being transferred between the trailer and a tow vehicle.

18. The trailer of claim 17 wherein the load sensor is operable to output a signal indicative of the direction of the load being transferred between the trailer and the tow vehicle.

19. The trailer of claim 15 wherein the controller is adapted to receive signals from sensors mounted on the tow vehicle.

* * * * *